1,644,309

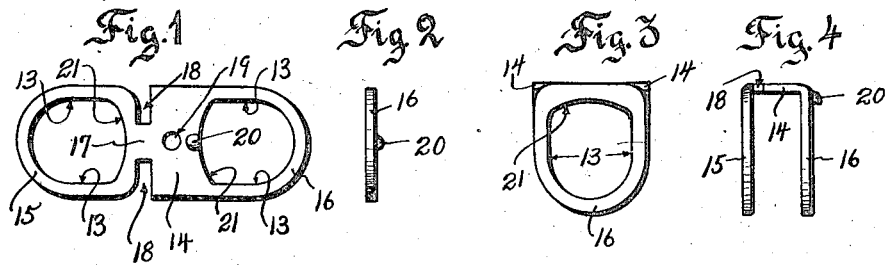
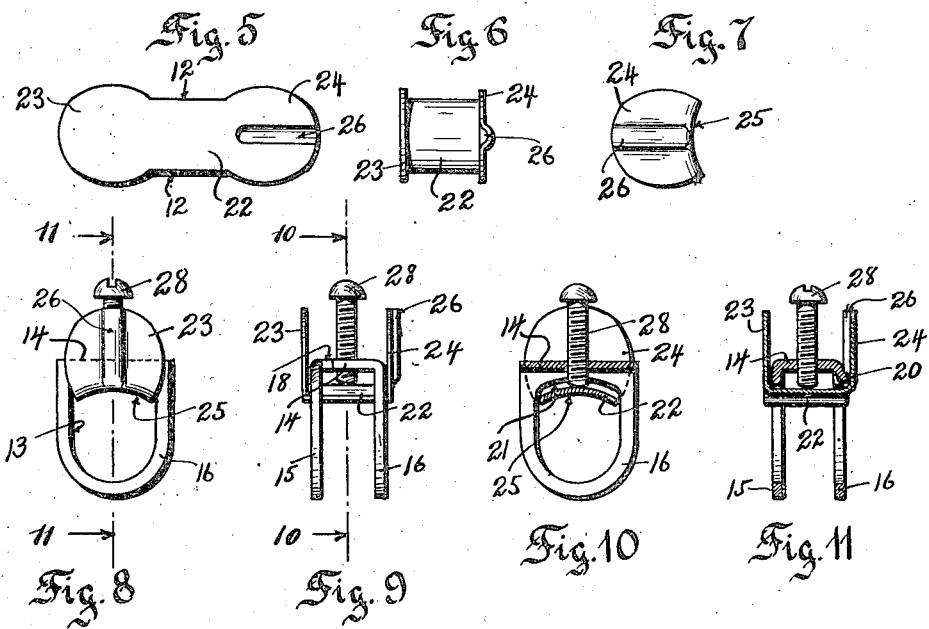
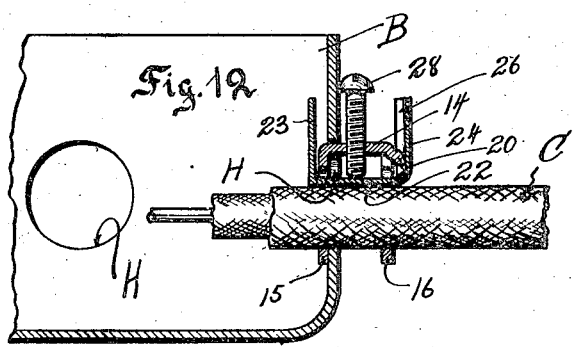
INVENTORS
George C. Thomas, Jr. & Lewis H. Church
BY
ATTORNEYS Patented Oct. 4, 1927.

UNITED STATES PATENT OFFICE.

GEORGE C. THOMAS, JR., OF ELIZABETH, AND LEWIS H. CHURCH, OF ROSELLE, NEW JERSEY, ASSIGNORS TO THE THOMAS & BETTS CO., OF ELIZABETH, NEW JERSEY, A CORPORATION OF NEW JERSEY.

CABLE CONNECTER.

Application filed July 8, 1926. Serial No. 121,231.

This invention relates to cable connecters and more particularly to adapter connecters capable of universally anchoring all sizes and shapes, flat or round, large or small, cable to electric fixture boxes.

One of the principal objects of the invention is to produce a size adjusting or adapting cable connecter capable of anchoring various size or shape cables in box holes without having to resort to the inconvenience of changing of parts, i. e., the removal and replacement of the pressure producing or operating means such as a cable clamp screw, or the removal and replacement of an adapter element, by which a connecter is changed from one cable size or shape to another cable size or shape.

A further object is to combine box hole closing means with a cable clamp plate by which that portion of the box hole not occupied by the connecter and cable is covered over by the hole closing means, and to this end we produce a connecter having a cover plate placed parallel and adjacent the box wall and the plate simultaneously moves across the box hole to close it as the operating means functions to anchor the connecter in a box and grip the cable thereto.

A further and important object of the invention is to produce a novel cable connecter frame of skeleton-like design and construction and which is suitable in size to fit into a box hole and is so formed as to expose a portion of the box hole edge. Box hole edge anchorage or engaging means is included on the skeleton-like frame by which the connecter anchors itself in a box hole. The connecter frame, in side elevation, may assume a general U-shaped formation which it is found effectively combines with the adapter element which constitutes an important part of this invention and which will now be briefly summarized.

The adapter element comprises in general a box hole closing means and a cable clamp means. The box hole closing means is slidably carried by the frame to close even a relatively large box hole into which a comparatively small cable might be placed. The cable clamp means is also slidably carried by the frame and is acted on by pressure producing or operating means, such as a screw.

The aforesaid operating means or screw performs several functions, namely, that of anchoring the connecter frame in the box hole, that of simultaneously gripping the cable between the exposed box hole edge and said cable clamp means, and that of moving the box hole closing means into position over the box hole. In other words the operating means acts on the adapter which grips the cable and closes the box hole.

Also it is an object to combine the foregoing cable clamp and box hole closing or shutter means into a simple one piece plate structure which results in producing what we may call an adapter for connecters. This adapter is unique in its structure and function and may preferably assume the form of a U-shaped part and in that respect is not unlike the U-shaped frame hereinbefore briefly mentioned.

A feature of this improved cable connecter, both the frame and adapter, is its light weight construction embodying a small amount of material which comes about by reason of the skeleton frame used as the connecter foundation on which the operating parts are mounted, and by reason of the fact that the adapter may be made of light gage sheet metal because no screw is attached thereto.

Our connecter is particularly useful in anchoring fibre armored cable or what might be called soft cable, as well as metal armored cable, in a box hole.

Our invention is illustrated in the accompanying drawings which show one practical example thereof, although changes in form and mode of operation and use may be resorted to for the purpose meeting general conditions.

Figures 1 to 4 inclusive illustrate the sheet metal light weight skeleton-like connecter frame in its various stages of production and prior to mounting the pressure producing means, the cable clamp plate, and the hole closing means thereon.

Figure 1 shows the frame stamped from flat sheet metal before it is bent into final form; and Figure 2 shows an edge view thereof.

Figures 3 and 4 illustrate the connecter skeleton-like frame in end elevation and side elevation respectively after the frame is bent into final form, the latter side view indicating as it does that the connecter is U-shaped in side elevation.

Figures 5 to 7 inclusive show the principal stages of producing the combination cable clamp and box hole closing plate, i. e. the adapter element.

Figure 5 is a view of the flat sheet metal blank from which said combination cable clamp box hole closing plate, (the adapter) is fashioned.

Figures 6 and 7 show bottom and end elevations of the adapter in final completed form.

Figures 8 to 11 show the general connecter assembly including the skeleton-like frame, the adapter, and the pressure producing means such as a screw.

Figure 8 is an end elevation, and Figure 9 is a side elevation of the complete connecter.

Figures 10 and 11 are sectional views taken respectively on the section lines 10—10 and 11—11 of the former views Figures 8 and 9.

Figure 12 is a general assembly view of a box, cable, and connecter showing the manner of use of the invention.

Electric fixture boxes B receive various types of cable C through the cable and connecter hole H and it has already been mentioned how this connecter anchors itself and a cable in the box by one simple cable clamping or operating means and closes the box hole as well. It matters not as to the size of the cable C for the connecter readily adapts itself to all cable sizes and produces a closed box hole H after the installation is made.

Referring further to the drawing for a description of the invention, its construction and use, there is shown a sheet metal connecter frame stamped or punched in one piece and formed of suitable size to fit into a box hole and to expose a portion of the box hole edge directly to the cable C. The frame includes box hole edge engaging and anchorage means of some suitable form by which the connecter is anchored in a box hole against longitudinal displacement, although the frame must move or adjust laterally in the hole to permit its insertion by the mechanic on the job.

The frame comprises a body or central web portion 14 carrying a ring-like end member 15 and a similar ring-like end member 16, the frame body being integrally included between the rings. The two rings 15 and 16 include arcuate internal ring edges 21 of long radius formed adjacent the frame body 14. Furthermore, it may be desirable to form straight parallel internal confronting edges 13 as a part of the ring to permit free slidable motion therein of the cable clamp plate of the adapter element to be described. The long confronting internal frame edges tend to make the ring slightly longer on one dimension which increases its bearing surface against the box wall as will be seen.

The frame body 14 is joined by a neck 17 to the ring 15 and this neck 17 defines an effective connecter anchorage means by which the connecter is anchored in a box hole, and the anchorage means employed in this example of the invention comprises box hole edge entry notches 18 formed in alignment and separated by the neck 17. The notches 18 are about equal in width to the thickness of a box wall and are adapted to abut or fit down over the box hole edge so as to place one ring 15 on one side of the box wall and the other ring 16 on the other side of the box wall. Thus the notches receive the box hole edge and it is seen that a portion of the hole edge is left exposed directly to the cable C.

The width of the frame body 14 may to advantage be made slightly less than the diameter of the box hole H into which the connecter is mounted in order that the connecter may be passed entirely through the box hole if desired. It is essential however, that at least one ring-like end, for example the ring adjacent the notches 18, be made slightly smaller than the box hole in order that the connecter may be placed into the box hole with the anchorage means 18 engaging the box hole edge by which the connecter is anchored against longitudinal displacement from the box.

The frame body portion 14 is provided with a threaded screw hole 19 located adjacent the anchorage means 18 and between the two ring-like end members 15 and 16. Also a boss 20 may be fashioned, pressed, or struck up from the stamping and it cooperates with the adapter, to be described, to prevent displacement thereof from its normal operating position in the connecter frame.

The flat sheet metal stamping of Figures 1 and 2 is fashioned into final form as shown in Figures 3 and 4 by subjecting the neck 17 to a sharp bending operation which bend occurs along the outer end of the neck 17 where it joins the ring 15 thereby setting the ring 15 at right angles to the frame body 14 with the box hole edge anchorage notches 18 disposed adjacent the inner face of the ring 15. In other words, the inner face or surface of the ring 15 defines one wall of the notches 18 while the other wall thereof is defined by the end edges of the frame body 14. Thus the box hole edge anchorage means 18 and the engagement thereof within a box hole, anchors the connecter in the box hole in a straddling position over the box wall, and the position of the notches 18 adjacent the ring 15 causes the ring to abut the box wall surface thus fitting up closely to the cable and connecter receiving hole.

The other end ring 16 is similarly bent at right angles to the frame body 14 and stands parallel to the ring 15 and this latter bend occurs transversely through the frame body so as to bring the boss 20 onto the end of the connecter thereby placing it in position to cooperate with and guide an adapter element throughout its lateral travel relatively to the frame.

While the example of the invention herein disclosed makes use of full fashioned rings 15 and 16 included as a part of the connecter frame, it follows that certain variations in structural form may be resorted to, although the present embodiment is found to function satisfactorily and afford a connecter frame of very light yet rigid construction.

Coming now to a description of the adapter element which is mounted in or on the connecter frame hereinbefore described, there is shown an adapter which clamps or grips against the cable and also closes the box hole. It is a sheet metal blank, as in Figure 5, punched from preferably lighter sheet metal than that from which the connecter frame 14 is made. The light weight blank adapter blank or stamping of Figure 5 consists of a central cable clamp plate 22 which constitutes the cable clamping element. It preferably includes parallel edges 12 which slide freely along the straight parallel edges 13 of the connecter frame.

Cover or shutter plates 23 and 24 are integrally included on each end of the clamp plate 22 and are bent at righ angles thereto so as to form a U-shaped member. Furthermore the pressing operation which forms the blank of Figure 5 into ultimate shape shown in Figures 6 and 7 imparts an arched contour 25 to the clamp plate portion 22 which conforms to and is concentric with the curved internal ring edges 21 of the connecter frame.

The U-shaped adapter part just described therefore comprises parallel upstanding cover or closing plates 23 and 24 designed to close the connecter adjacent the cable and also close the box hole H, i. e. close all that remaining portion of the box hole not occupied by the connecter and the cable. The cover plates 23 and 24 are preferably circular in form. At least one of the cover plates 23 or 24 is fashioned or pressed with a groove 26 therein to freely and movably receive the boss 20 of the frame to prevent relative rotation between the frame and U-shaped adapter.

The connecter frame and adapter are assembled by inserting the adapter element through the frame rings and by finally pressing the plates 23 and 24 into ultimately parallel position which confines the groove 26 over the boss 20 to hold the parts together. The arched cable clamp plate 22 fits up closely to the frame edges 21 thus opening the connecter rings full size to receive large cable. The parallel edges 12 of the clamp plate 22 slide freely up and down the ring edges 21 to permit the camp plate 22 and closing plates 23 and 24 to travel in the rings to close them in part or fully, as the size of the cable may require. In other words, the cooperating parallel edges and concentric formations of the frame and adapter produce a well balanced and close fitting yet freely movable relation of parts, the general design and ultimate assembly of which imparts symmetry to the connecter.

The cover plates 23 and 24 are slidably retained on the outside of and in parallel relation to the rings 15 and 16. In other words the U-shaped adapter and the connecter frame slide relatively one on the other, and as the clamp plate 22 moves away from the frame body 14, the size of the available opening through the connecter rings 15 and 16 becomes smaller and similarly becomes larger if moved in the other direction, and thus the connecter adapts and accommodates itself to all sizes of cable within the range of the connecter.

Suitable operating or pressure producing means in the form of a screw 28 is mounted in the threaded hole 19 of the connecter frame 14 and is adapted to be screwed down against the clamp plate 22 of the adapter. The screw therefore delivers pressure to the clamp plate to positively drive it against a cable and grip a cable between the exposed box hole edge and said clamp plate. Furthermore, the screw acts to hold the closing plates in position over the connecter and box hole.

The parallel lengthwise ring edges 13 advisedly make the rings slightly longer than the diameter of a box hole so that at least one ring of the frame may readily be inserted through the box hole and then overlap or abut the box wall surface opposite to that from which the insertion was made. For example the ring 15 being oval, is caused to overreach the box hole edge while at the same time the connecter anchorage notches 18 are in place. Therefore, the notches 18 and oval ring 15 combine to form a large size spreading abutment on one side of the box wall, while the end of the frame body 14 at the neck forms an abutment on the other side of the box wall. The connecter therefore cannot move longitudinally in either direction.

Figure 12 shows how the connecter frame is inserted in the box with the anchorage notches 18 registering with or over the box hole edge. Thus the connecter frame exposes a large portion of the box hole H directly to the cable C so that the cable rests in direct contact with the box hole edge H. The screw 28 is now run down against the clamp plate 22 which forces it against the cable to positively grip the cable C between the box hole edge and the plate 22. Furthermore the pressure of the screw causes the connecter to react in the box hole and firmly seat the notches 18 against and over the exposed box hole edge. In this way the single pressure producing means, i. e. the screw 28, or its equivalent, acts to simultaneously perform several functions, namely, that of gripping against the cable, that of forcing a seating engagement between the box hole edge and connecter notches 18, and that of holding the sliding closure plates 23 and 24 in position over the box hole and over the connecter.

We have therefore produced a connecter comprising two main cooperating U-shaped parts, as noted for example in the side view assemblies which portray this double U-shaped inverted construction. The two parts are inverted one inside the other and the legs of the U-parts slide one on the other to adjust the size of the cable opening through the connecter. A screw is mounted on one U-part and forces against the other, and means are provided in the boss 20 to operate between the two U-members to maintain the base of one U-part, represented by the numeral 22, directly in line with the base of the other U-part, indicated at 14, so that the cable clamping U-part is always in line with and under the influence of the screw 28.

What is of further manifest novelty is that the two U-parts not only slide parallel one in the other but they interlock, i. e. the U-shaped adapter 22 fits through the rings 15 and 16 of the U-shaped frame which means that the adapter is inside the frame rings while at the same time the frame rings are themselves inside of the adapter. This is evident, i. e. both parts are in fact inside the other which constitutes a unique well braced and interlocked construction. Furthermore the rings 15 and 16 embrace the cable C and the adapter to thereby hold the connecter on the cable and to hold the adapter in the connecter. The screw 28 stands parallel in the frame body 22 between the two cover plates 23 and 24 and is easy to reach with a screw driver. The clamp plate 22 of the adapter protects the cable from the screw.

The connecter is symmetrical in design and construction. It is of comparatively small size and light in weight. It adapts itself to many sizes and shapes of cables and always closes the box hole regardless of cable size received thereinto. It is unique in its ability to employ the rigid and substantial box hole edge or rim itself as the foundation on and against which to anchor both the connecter and the cable, and it is unique in employing a single pressure producing means to carry out the several functions named.

The connecter is capable of insertion from either side of the box. It fits inside or outside thereof. Its screw may be placed inside the box as well as outside by merely reversing the connecter. It is therefore universal in use, and serves admirably for what is known as old house work as well as new house work.

It is noted that our improved frame 14 together with appropriate pressure producing means, as the screw, and the cable embracing ring or rings, and without the adapter 22, constitutes a satisfactory, inexpensive, positively operating cable connecter, and particularly so for metal armored cable and conduit. The soft or fiber covered cable C shown in the attached drawing advisedly requires a cable clamp plate 22 to bear against and protect it from the screw end and advisedly requires the cover plates 23 and 24 to close the box hole since soft cable C is usually smaller than metal armored cable not shown. Therefore the frame 22 including box hole edge anchorage means 18, and being so formed as to expose a portion of the box hole edge to a cable, together with the screw 28, is in itself an effective cable connecter for metal armored cable.

What we claim is:

1. Cable and box connecting means comprising in combination, a box having a cable and connecter receiving hole, a member suitable in size to fit into the box hole and formed to expose a portion of the box hole edge directly to the cable, anchorage means included on the member into which seats the box hole edge, an adapter including a cable clamp plate and box hole closing plate slidable laterally on the member to bear against a cable and close that remaining portion of the box hole not occupied by the cable and connecter, and pressure producing means acting on the adapter to grip the cable between the cable clamp plate and hold the closing plate over the box hole.

2. A cable connecter including a portion formed to fit into a box hole and leave exposed a part of the box hole edge, anchor means included on the portion into which a box hole edge is adapted to seat, an adapter which includes a cable clamp plate and box hole closing plate means for slidably mounting the adapter on the portion, and pressure producing means mounted on the connecter cooperating with the adapter.

3. A connecter comprising a cable embracing ring formed at right angles on a box hole edge anchorage portion, an adapter slidably mounted on the connecter, which adapter includes a cable clamp plate formed at right angles to a box hole closing plate, the cable clamp plate being parallel to the box hole edge anchorage portion and the box hole closing plate parallel to the cable embracing ring, and pressure producing means mounted on the connecter adapted to force the cable clamp plate against a cable and force the anchorage portion against a box hole edge.

4. A connecter comprising a cable embracing ring formed at right angles on a box hole edge anchorage portion, an adapter slidably mounted on the connecter, which adapter includes a cable clamp plate formed at right angles to a box hole closing plate, the cable clamp plate being parallel to the box hole edge anchorage portion and the box hole closing plate parallel to the cable embracing ring, and a screw threaded through the anchorage portion bearing on the cable clamp plate and adapted to react and force the anchorage portion against a box hole edge.

5. A connecter comprising two U-shaped parts including means to hold them in slidably inverted relation to each other, and formed to fit into a box hole and leave exposed a portion of the hole edge directly to a cable, and means to react between the two parts to force one against a cable and force the other against a box hole edge to anchor it in a box.

6. A connecter comprising two U-shaped parts including means to hold them in slidably inverted relation to each other, and formed to fit into a box hole and leave exposed a portion of the hole edge directly to a cable, and a screw mounted in one part directed toward the other to forcibly move the parts in opposite direction.

7. A connecter comprising two U-shaped parts assembled in inverted relation, means to hold the two parts slidable one in relation to the other, one part including box hole edge receiving notches and also including cable embracing rings, the other part including a cable clamp plate and box hole closing plate, and pressure producing means acting to move the parts in opposite direction.

8. A connecter comprising two U-shaped parts assembled in inverted relation, means to hold the two parts slidable one in relation to the other, one part including box hole edge receiving notches and also including cable embracing rings, the other part including a cable clamp plate and box hole closing plate, and a screw threaded through the part including the notches and adapted to turn and bear against the cable clamp plate.

9. A connecter comprising a heavy sheet metal U-shaped frame formed to fit into and expose a portion of a box hole edge and having hole edge receiving notches, a light sheet metal U-shaped adapter including a clamp plate and box hole closing plate, guide means holding the two parts in slidable inverted relation, and screw means mounted in the heavy metal part bearing on the lighter part adapted to force the receiving notches over the edge of a box hole and force the other part against a cable.

10. A connecter comprising a frame body including anchorage means to engage a box hole edge, parallel cable embracing rings formed on the frame body, an adapter including a cable clamp plate mounted parallel to the frame body and including box hole cover plates mounted parallel and slidable on the rings, guide means permitting free relative motion between the adapter and other part, and pressure producing means acting between the two parts to forcibly move them in opposite direction.

11. A connecter comprising a frame which includes spaced parallel rings integral on a frame body having anchorage means to engage a box hole edge, a screw threaded through the frame body between the rings, an adapter which includes spaced parallel box hole closing plates integral on a cable clamp plate, the frame body and cable clamp plate being parallel and the aforesaid screw bearing on the cable clamp plate, and the rings and box hole closing plates being parallel and slidable in relation to each other.

12. A connecter comprising a skeleton frame including a body with a ring extending at right angles therefrom and provided with anchorage means to engage a box hole edge, said ring having internal confronting parallel edges, a cable clamp plate slidably confined inside the ring and having parallel edges which slidably cooperate with the parallel confronting ring edges, and pressure producing means carried on the connecter to bear against the cable clamp plate.

13. A connecter comprising a skeleton frame including a body with a ring extending at right angles therefrom and provided with anchorage means to engage a box hole edge, said ring having internal confronting parallel edges, a cable clamp plate slidably confined inside the ring and having parallel edges which slidably cooperate with the parallel confronting ring edges, and a box hole closing plate integral with and at right angles to the cable clamp plate and parallel to the ring and slidably retained beside the ring, and pressure producing means carried on the connecter to bear against the cable clamp plate.

14. A connecter comprising a frame including a body with a cable embracing ring on each end at right angles thereto thus providing spaced parallel rings, at least one of the rings formed oval to fit through a box hole and abut the box wall surface opposite the side from which it was inserted, anchorage means included on the frame body adjacent the oval ring to engage a box hole edge, a U-shaped adapter slidably mounted in the rings and including a cable clamp plate and box hole cover plate, and pressure producing means mounted on the frame body to apply pressure on the adapter.

15. A connecter as defined in claim 14 wherein the cable clamp plate and rings are provided with cooperating parallel edges which permit a free guiding movement between the adapter and frame.

16. A connecter as defined in claim 14 wherein the rings are made with an arched internal edge adjacent the frame body, and the cable clamp plate is similarly arched to fit the arched frame edge.

17. A connecter comprising a skeleton-like frame body including spaced parallel cable embracing rings and anchorage means between the rings to engage a box hole edge, a cable clamp plate mounted for free lateral movement inside the rings and parallel to the frame body, a box hole closing plate formed at right angles on each end of the clamp plate and disposed outside of and parallel to the rings, and pressure producing means to act against the cable clamp plate and render effective the anchorage means.

In testimony whereof we affix our signatures.

GEORGE C. THOMAS, Jr.
LEWIS H. CHURCH.